3,369,963
CONTROLLING AND ERADICATING FUNGI WITH
O - (3 - AMINO - CHLOROBENZOYL) BENZOIC
ACIDS
Earl P. Williams, Pen Argyl, Pa., assignor to General
Aniline & Film Corporation, New York, N.Y., a corporation of Delaware
No Drawing. Filed Oct. 14, 1963, Ser. No. 316,164
1 Claim. (Cl. 167—30)

ABSTRACT OF THE DISCLOSURE

A method is provided for controlling and eradicating fungi which attack chlorophyllaceous plants by applying to the loci of said plants a fungicidal amount, i.e., from 0.01% to 5% by weight of liquid or solid carrier, of o-(3-amino-chlorobenzoyl) benzoic acid or the zinc salt thereof.

The present invention relates to the method of controlling and eradicating fungi attacking chlorophyllaceous plants with a fungicidal composition containing o-(3-amino-chlorobenzoyl)benzoic acid as the active fungicide.

Various organic compounds are currently employed in the control and eradication of fungi. The outstanding and currently used fungicide sold commercially under the brand name of "Captan" involves a costly and intricate synthesis.

It is an object of the present invention to provide compositions comprising o-(3-amino-chlorobenzoyl) benzoic acids as effective fungicides which are known compounds, are readily prepared by inexpensive syntheses and are commercially available at a price range far below that charged for "Captan."

It is a further object to provide a new fungicidal composition which is not toxic, within certain limits of concentration, to plants and warm-blooded animals.

A still further object is to provide a method of protecting chlorophyllaceous plants subject to attack by fungi by treating the loci of said fungi with o-(3-amino-chlorobenzoyl) benzoic acids.

Other objects and advantages will become more clearly manifest from the following description:

I have found that o-(3-amino-chlorobenzoyl) benzoic acids having the following general formula:

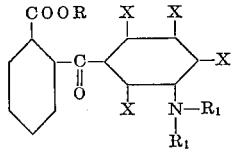

wherein R represents either hydrogen or zinc, $R_1$ represents either hydrogen or methyl and X represents either hydrogen or chlorine, at least one X and not more than two X's being chlorine, are effective fungicides when applied in a liquid medium or in an inert solid carrier such as charcoal, silica gel, clay, fuller's earth and the like. When water is employed as a liquid medium the fungicidal compound is first dissolved in a small quantity of a suitable water-miscible organic solvent, such as acetone, methyl, ethyl, ketone, dioxane and the like and the resulting solution added to water containing a sufficient quantity of any commercially available surface active agent which will maintain the dispersion of the fungicide in the liquid medium. Any of the well known and commercially available surface active agents may be employed, such as for example, the alkali metal salts of long chain alkyl sulfates, alkali metal salts of alkyl aryl sulfonic acids, polyethylene glycols ethers of alkyl phenols, etc. Products of this type are legion and no difficulty will be encountered in the selection of the most suitable surface active agent which will depend of course upon price, availability, etc.

The fungicidal agent may also be applied in non-aqueous media, such as light, i.e. purified, petroleum hydrocarbons particularly light mineral seal oil, decolorized kerosene, refined gas oil and very light lubricating oils and the like, which are normally employed in agricultural sprays, or in emulsion form. In the latter case, a fungicidal amount of the fungicidal agent in the smallest quantity possible of either acetone, methyl ethyl ketone or dioxane and the solution diluted with a desired quantity of a light petroleum hydrocarbon containing a sufficient amount of any well known surface active agent as emulsifier.

The amount of the fungicidal agent to be employed may range from .001% to 50% by weight of liquid or solid carrier. For practical purposes, I have found that an amount ranging from .01% to 5.0% by weight of the fungicidal agent is sufficient to yield a sprayable or testing composition which will ensure complete coverage of the fungi infesting loci.

As examples of the fungicidal agents conforming to the foregoing general formula the following are illustrative:

(1) o-(3-amino-4-chlorobenzoyl) benzoic acid
(2) o-(3-dimethylamino-4-chlorobenzoyl) benzoic acid
(3) o-(3-amino-2,6-dichlorobenzoyl) benzoic acid
(4) o-(3-methylamino-5-chlorobenzoyl) benzoic acid
(5) o-(3-amino-4-chlorobenzoyl) benzoic acid zinc salt All of the foregoing compounds are well known and are readily prepared in accordance with the procedure given in the prior art. For example, compound (1) is prepared by the procedure described in Beilstein, Organische Chemie, Band XIX, p. 661, fourth paragraph.

In order to demonstrate the effectiveness of compounds 1 to 5 as fungicides the following test procedure was resorted to:

Late blight fungus, phytophthora infestans was the organism used in the test procedure. The organism was reared on sterile wheat seeds in flasks kept at room temperature. Organisms used are transferred 10 days prior to testing. A slurry is made of the cycelia and this is broken up by means of a Waring Blendor before application to the test plants.

Duplicate tomato plants Bonney Best Variety 4 to 5 inches high are placed on a rotating turntable and sprayed with the candidate test chemical using a portion of 1% stock solution diluted to 0.01% concentration. The 1% stock solution is prepared by dissolving one gram of the fungicidal agent to be tested in 5 to 10 mls. of acetone. To this was added three drops (0.1 gram) of mixed emulsifiers and the resulting solution diluted to 100 mls. with water. The mixed emulsifiers were a blend of equal volumes of the following: Trition X–155 (Rohm and Haas), alkylaryl polyether alcohol, Triton X–161 (Rohm and Haas), blend of alkylaryl polyether alcohols with organic sulfonates, Igepal CO–430, monylphenoxypoly (ethyleneoxy)ethanol, Igepal CO–630, monylphenoxypoly(ethyleneoxy)ethanol, and Tergitol NPX (Carbide and Carbon), monylphenyl polyethylene glycol ether.

Thirty mls. of the 0.01% conc. (100 p.p.m.) was applied to the pair of plants using a De Vilbis spray gun with air pressure at 20 pounds. Application of this spray took 30 seconds and the foliage was wetted to run off. Six plants were sprayed with the formulation without test chemical and were held as checks. An additional six plants were sprayed with Captan and are held for comparison standards. As soon as the spray had dried, the plants were innoculated by again placing them on the turntable and spraying with the mycelial brei for 30 seconds.

Following innoculation the plants are incubated for 48 hours at 72° F. and at 100% relative humidity. The plants are then removed from the incubation chamber and placed in a shade house in the greenhouse for an additional 48 hours.

The total number of lesions per eleven 15X magnification fields on 11 leaflets of the three top leaves of each plant are counted. A similar count is made on the check plants and on the plants treated with the standard. The average number of lesions per plant is calculated. Control is rated according to the percent control of the disease.

| Fungicidal Agent | Level (p.p.m.) | Lesions | Percent Control |
|---|---|---|---|
| Control | 0 | 78 | 0 |
| "Captan" | 100 | 5 | 94 |
| (1) | 100 | 12 | 90 |
| )2) | 100 | 36 | 92 |
| (3) | 100 | 11 | 90 |
| (4) | 100 | 13 | 89 |
| (5) | 100 | 12 | 90 |

Each of the fungicidal agents (1) to (5) had an 0.1% concentration prepared as above for individually spread open individual 3" x 2" flats of soil infested with damp-off fungi, Fusarium spore. After hosing with water to a depth of 8" carnation seedlings were placed in the treated soil 6" apart. The seedlings grew vigorously and no evidence of damping off was observed.

All diseases that primarily attack underground parts, and which are due to soil borne fungi such as root rot caused by Pythium, Rhizoctomimia wilt caused by Fusarium, verticillium, etc. were effectively controlled by spraying the soil with aqueous dispersions of the compounds 1 to 5 at 0.1% concentration.

I claim:
1. The method of protecting chlorophyllaceous plant material subject to attack by fungi which comprises applying to loci of said material the fungicidal amount ranging from 0.01% to 5% by weight of fungicidal carrier of o-(3-amino-4-chlorobenzoyl) benzoic acid.

References Cited

Beilstein, Organische Chemie, Band XIV, p. 661.

ALBERT T. MEYERS, *Primary Examiner.*

R. S. DORCAS, *Assistant Examiner.*